Sept. 24, 1968    F. E. WATKINS    3,402,912
MANUAL AND PISTON VALVE OPERATOR
Filed June 29, 1967
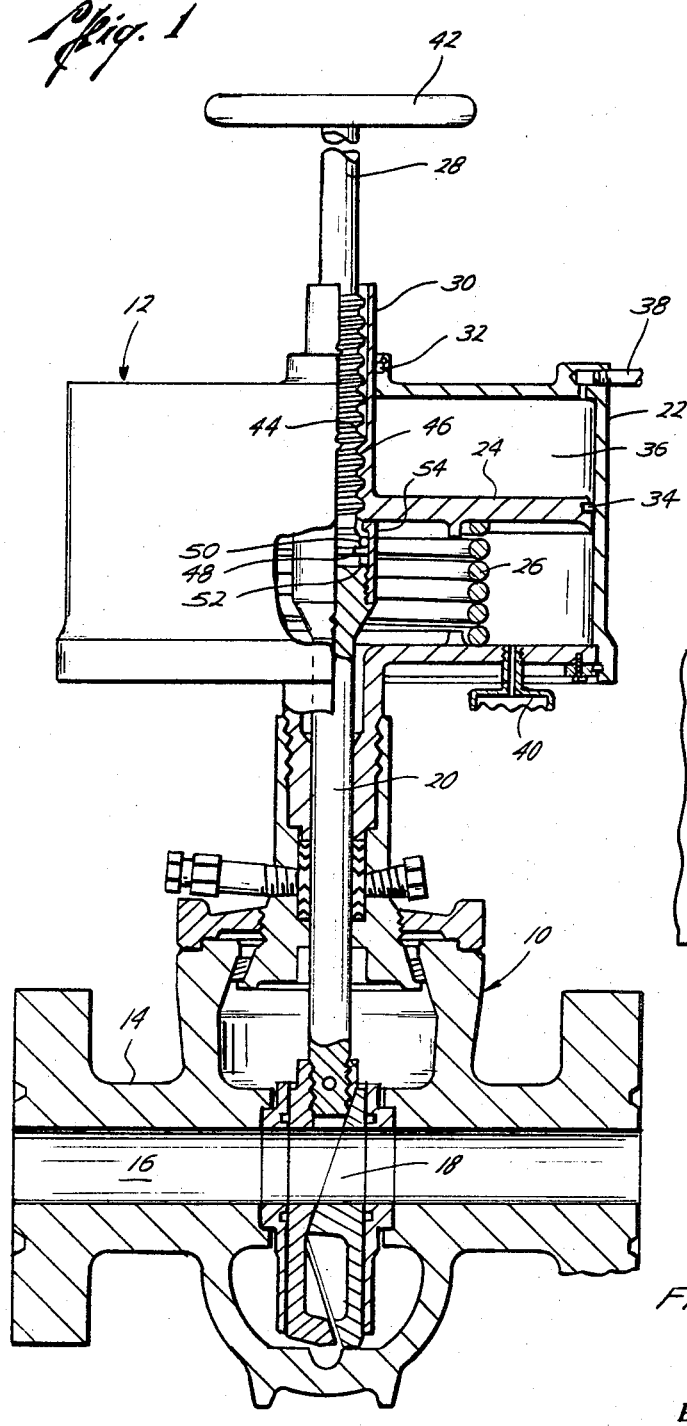
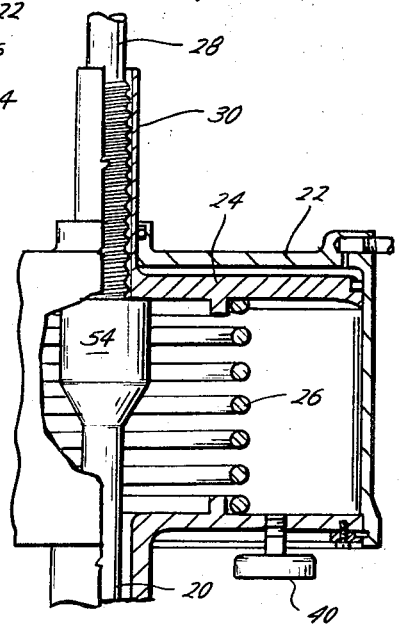
Fred E. Watkins
INVENTOR
BY James F. Weiler
William A. Stout
Dudley R. Dobie, Jr.
Henry W. Hope
ATTORNEYS

United States Patent Office 3,402,912
Patented Sept. 24, 1968

3,402,912
MANUAL AND PISTON VALVE OPERATOR
Fred E. Watkins, Houston, Tex., assignor to Camco, Incorporated, Houston, Tex., a corporation of Texas
Filed June 29, 1967, Ser. No. 649,953
3 Claims. (Cl. 251—14)

ABSTRACT OF THE DISCLOSURE

A manual and piston actuated valve operator for operating a reciprocating gate valve in which the piston includes an operating cylinder and a hand operated shaft threadably engaging the interior of the tubular extension and connected to the valve stem by a rotatable thrust bearing connection between the shaft and the stem for longitudinally moving the stem and valve, but allowing rotative movement between the shaft and stem.

Background of the invention

The present invention relates to an improvement in a combination manual and piston actuated valve operator for actuating a reciprocating gate valve used to pneumatically or hydraulically operate the valve in one direction with a return spring for actuating the valve in the other direction in which all seals are subjected to a reciprocating motion only, and the valve can be mechanically opened or closed without requiring movement of the piston or a manual force to overcome the spring.

In general, combination manual and piston actuated valve operators are old, such as shown in Patent No. 3,029,060. However, in the prior art devices, manual operation of the valve was generally through a rotational motion through one or more seals which caused twisting and damage to the seals and thus decreasing their life. In addition, some prior art devices have an undesirable manual operation which requires resetting of the piston, movement of the piston against the fluid pressure, or manual operation against the return spring. The present invention overcomes these problems by subjecting the pressure seals to a reciprocating motion only, and allows manual operation of the valve without movement of the piston or without overcoming the return spring.

Summary

The present invention is directed to improvements in a manual and piston actuated valve operator for a reciprocating gate valve in which the piston includes a tubular extension axially aligned with the valve stem and which slidably and sealably extends out of an operating cylinder from one side of the piston and in which a hand operated shaft threadably engages the interior of the tubular extension and extends therethrough and is connected to the valve stem.

Still a further object of the present invention is the provision of an improvement in a manual and piston valve operator for actuating a reciprocating gate valve having an elongate stem in which the manually operated shaft threadably extends a tubular piston extension and is connected to the valve stem by a rotatable thrust bearing connection for longitudinally moving the stem and valve, but allowing rotational movement between the stem and shaft.

Brief description of the drawings

In the attached drawing, like character references refer to like parts throughout the several views in which, FIGURE 1 is an elevational drawing, partly in section, illustrating the present invention in one piston operating position, FIGURE 2 is a fragmentary elevational view, partly in section, illustrating the apparatus of FIGURE 1 in its second piston operating position.

Description of the preferred embodiment

Referring now to the drawings, and particularly to FIGURE 1, the reference numeral 10 generally indicates a conventional reciprocating gate valve and a manual and piston actuated valve operator generally indicated by the reference numeral 12. The valve 10 generally includes a housing 14 having a passageway 16, a gate 18 and a reciprocating actuating stem 20. The valve 10 as shown is a lift to close and down to open type, but of course, could be a lift to open, if desired. As the valve 10 is conventional and is not part of the present invention, no further description is believed to be necessary.

The valve operator 12 generally includes a cylinder 22, a piston 24 movable therein, a return spring 26, and a manually actuated shaft 28.

The piston 24 includes a tubular extension 30 on a first side of the piston slidably extending through one end of the chamber 22 and is axially aligned with the stem 20. A seal 32 provided between the cylinder end and the extension 30, and a seal 34 is provided about the piston 24 thereby enclosing a fluid chamber 36 which is in communication with a line 38 through which pressure, either pneumatic or hydraulic, may be exerted to move the piston 24 downwardly to actuate the valve 10 in one direction as will be more fully described hereinafter. The spring 26 acting on the second side of the piston 24 yieldably urges the piston 24 upwardly to move the valve stem 20 upwardly when pressure is relieved from the chamber 36. A release vent 40 is provided in the cylinder 22 along the second side of the piston 24 to the atmosphere.

A manually operated hand wheel 42 is connected to the manual shaft 28 for manual operation of the valve. Shaft 28 extends internally of the tubular extension 30 and includes threads 44 which coact with and are engageable with threads 46 on the inside of the extension 30. Manual actuating shaft 28 is coupled to the valve stem 20 so that any longitudinal movement imparted to the shaft 28 will also be imparted to the stem 20. Preferably, the connection between the shaft 28 and the stem 20 is by a rotatable thrust bearing connection such as annular shoulder 48 provided on the shaft 28, and a thrust bearing cage having upper bearings 50 and lower bearings 52 enclosed in a cage 54 whereby a reciprocating motion may be transmitted from the shaft 28 to the stem 20 without any rotary motion being transferred to the stem 20.

In operation, pressure may be applied through the line 38 into the chamber 36 to force the piston 24 down overcoming the return spring 26 thereby moving the shaft 28 and the valve stem 20 downwardly, as shown in FIGURE 1, to open the valve 10. As long as the fluid pressure is maintained in the chamber 36 the valve 10 will remain open. If the pressure should be released from the chamber 36, the return spring 26 will exert sufficient force to move the piston 24, the shaft 28 and thus the interconnected stem 20 up to close the valve as shown in FIGURE 2. Thus the valve operator 12 as shown, in the event of a pressure failure, operates to close the valve 10 in a closed position.

In the event it is desirable to manually operate the valve operator 12 in the absence of pressure in the chamber 36, a rotary motion may be applied to the hand wheel 42 and to the shaft 28 thereby longitudinally moving the shaft 28 relative to the extension 30. Since the spring will hold the piston 24 and extension 30 in an upward position, the longitudinal motion of the shaft 28 will be imparted to the valve stem 20. The imparted motion will in turn cause the valve 10 to be opened or closed depending upon the direction of rotation.

It is noted that the valve operator 12 requires only the seals 32 and 34 to seal the chamber 36 and that these seals are subjected to a reciprocating motion only as the piston 24 and extension 30 move upwardly and downwardly. Since the hand shaft 28 is actuated through the interior of the extension 30 and is isolated from the chamber 36 no seals are required about the shaft 30. Thus the valve operator 12 has the advantage that rotation through a seal, which can twist and damage an O-ring seal, is not required. Additionally, the valve 10 can be mechanically closed and opened without requiring any resetting movement of the piston, the manual operation of the valve operator 12 does not have to overcome spring 26 in order to actuate the valve 10, and since the piston 24 does not move during manual operation it is not necessary to provide free movement of fluid through a release port from the chamber 36 or overcome a fluid pressure in the cylinder 22 before the valve can be manually operated. The position of operation of the valve 10 may be quickly and visually ascertained by the location of the amount of the tubular extension 30 extending from the cylinder 22 and the relationship of the hand wheel 42 or shaft 28 with respect to the extension 30.

The present invention is well adapted to carry out the objects and attain the ends and advantages mentioned as well as others inherent therein. While a presently preferred embodiment is given for the purpose of disclosure, numerous changes in the details of construction and arrangement of parts may suggest themselves to those skilled in the art and which are encompassed within the scope of the invention and the scope of the appended claims.

What is claimed is:

1. A valve operator for actuating a reciprocating gate valve having an elongate operating stem comprising,
    a cylinder,
    a piston movably positioned in said cylinder and operable by fluid pressure on one side of the piston to move the piston in a first direction,
    said piston including a tubular extension axially aligned with the stem and slidably and sealably extending out of the cylinder from said one side of the piston,
    a spring acting to move the piston in a second direction,
    a hand operated shaft threadably engaging the interior of the tubular extension,
    a rotatable thrust bearing connection between the shaft and the valve stem from longitudinally moving the stem and the valve but allowing rotational movement between the shaft and stem.

2. A valve operator for actuating a reciprocating gate valve having an elongate operating stem comprising,
    a cylinder enclosing one end of the stem,
    a piston movably positioned in said cylinder and operable by fluid pressure on a first side of the piston for moving the piston toward said valve,
    said piston including a tubular extension axially aligned with the stem and slidably and sealably extending out of the said cylinder and away from the valve,
    a spring in the cylinder on the second side of the piston yieldably urging the piston away from the valve,
    a hand operated shaft threadably engaging the interior of the tubular extension,
    said stem longitudinally connected to but rotatably free from said shaft on said second side of the piston.

3. A valve operator for actuating the operating stem of a reciprocating gate valve comprising,
    a cylinder having a pressure connection,
    a piston movably positioned in said cylinder and operable by fluid pressure on one said of the piston to move the piston in a first direction,
    said piston including a tubular extension axially aligned with the stem and slidably and sealably extending out of the cylinder from said one side of the piston,
    a spring acting to move the piston in a second direction,
    a hand operated shaft threadably engaging the interior of the tubular extension and extending through said extension,
    an annular shoulder on the shaft on the second side of the extension,
    a thrust bearing housing enclosing said shoulder and including thrust bearings on either side of the shoulder, said housing connected to the operating stem whereby the shaft and the stem are longitudinally connected but rotational movement is provided between the shaft and stem.

References Cited
UNITED STATES PATENTS

| | | | |
|---|---|---|---|
| 2,733,041 | 1/1956 | Crookston | 251—14 |
| 3,029,060 | 4/1962 | Anderson | 251—14 |
| 2,624,659 | 1/1953 | Haug | 92—114 |

FOREIGN PATENTS

| | | |
|---|---|---|
| 824,310 | 12/1959 | Great Britain. |

ARNOLD ROSENTHAL, *Primary Examiner.*